US011630838B1

(12) United States Patent
Gujral et al.

(10) Patent No.: US 11,630,838 B1
(45) Date of Patent: Apr. 18, 2023

(54) CONFLICT-FREE REPLICATED DATA TYPES IN A DATABASE

(71) Applicant: Amazon Technologies, Inc., Seattle, WA (US)

(72) Inventors: Shivam Gujral, Seattle, WA (US); Alazel Acheson, Redmond, WA (US); Chris R. Baker, Seattle, WA (US); Rajesh Khetan, Sammamish, WA (US); Matthew William Berry, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 803 days.

(21) Appl. No.: 16/370,689

(22) Filed: Mar. 29, 2019

(51) Int. Cl.
  *G06F 16/20* (2019.01)
  *G06F 16/27* (2019.01)
  *G06F 16/23* (2019.01)

(52) U.S. Cl.
  CPC .......... *G06F 16/27* (2019.01); *G06F 16/2365* (2019.01)

(58) Field of Classification Search
  None
  See application file for complete search history.

(56) References Cited

U.S. PATENT DOCUMENTS

| 7,401,103 | B2* | 7/2008 | Novik | G06F 16/275 |
| | | | | 707/610 |
| 7,769,714 | B2* | 8/2010 | Lu | G06F 16/273 |
| | | | | 707/610 |
| 2013/0212131 | A1* | 8/2013 | Reddy | G06F 16/9024 |
| | | | | 707/E17.019 |

OTHER PUBLICATIONS

Redis Labs, "Active-Active Geo-Distribution (CRDT-Based)", Redis Enterprise Technology, Available Online at <https://redislabs.com/redis-enterprise/technology/active-active-geo-distribution/, 2019, 13 pages.

\* cited by examiner

*Primary Examiner* — Belix M Ortiz Ditren
(74) *Attorney, Agent, or Firm* — Nicholson De Vos Webster & Elliott LLP

(57) ABSTRACT

Techniques for implementing conflict-free replicated data types in a database are described. A first database replica of a database hosted by a provider network receives an identifier of a first operation to perform on an element stored in the database, the element being of a conflict-free replicated data type. A second database replica of the database receives an identifier of a second operation to perform on the element. The second operation is determined to not conflict with the first operation. The first operation and the second operation are performed on the element stored by the first database replica. The first operation and the second operation are performed on the element stored by the second database replica.

18 Claims, 10 Drawing Sheets

```
┌─────────────────────────────────────────────────────────────────┐
│ RECEIVING, BY A FIRST DATABASE REPLICA OF A DATABASE INSTANCE   │
│ HOSTED BY A PROVIDER NETWORK, AN IDENTIFIER OF A FIRST          │
│ OPERATION TO INCREMENT AN ELEMENT STORED IN THE DATABASE        │
│ INSTANCE, WHEREIN THE ELEMENT IS OF A CONFLICT-FREE REPLICATED  │
│ DATA TYPE                                                       │
│ 705                                                             │
└─────────────────────────────────────────────────────────────────┘
                                 ↓
┌─────────────────────────────────────────────────────────────────┐
│ INSERTING A FIRST ENTRY INTO A DATA STRUCTURE COMPRISING A      │
│ PLURALITY OF ENTRIES, EACH ENTRY IN THE DATA STRUCTURE          │
│ INCLUDING A GLOBAL SEQUENCE NUMBER AND AT LEAST ONE PENDING     │
│ OPERATION AGAINST ONE OR MORE OF A PLURALITY OF REPLICAS OF     │
│ THE DATABASE INSTANCE, WHEREIN THE PLURALITY OF REPLICAS OF     │
│ THE DATABASE INSTANCE INCLUDES THE FIRST DATABASE REPLICA AND   │
│ A SECOND DATABASE REPLICA, AND WHEREIN THE FIRST ENTRY          │
│ INCLUDES THE ELEMENT, THE FIRST OPERATION, AND A FIRST          │
│ GLOBAL SEQUENCE NUMBER                                          │
│ 710                                                             │
└─────────────────────────────────────────────────────────────────┘
                                 ↓
┌─────────────────────────────────────────────────────────────────┐
│ RECEIVING, BY A SECOND DATABASE REPLICA OF THE DATABASE         │
│ INSTANCE, AN IDENTIFIER OF A SECOND OPERATION TO INCREMENT      │
│ THE ELEMENT                                                     │
│ 715                                                             │
└─────────────────────────────────────────────────────────────────┘
                                 ↓
┌─────────────────────────────────────────────────────────────────┐
│ DETERMINING, BASED ON THE FIRST ENTRY IN THE DATA STRUCTURE,    │
│ THAT THE SECOND OPERATION DOES NOT CONFLICT WITH THE SECOND     │
│ OPERATION                                                       │
│ 720                                                             │
└─────────────────────────────────────────────────────────────────┘
                                 ↓
┌─────────────────────────────────────────────────────────────────┐
│ INSERTING A SECOND ENTRY INTO THE DATA STRUCTURE, WHEREIN THE   │
│ SECOND ENTRY INCLUDES THE ELEMENT, THE SECOND OPERATION, AND A  │
│ SECOND GLOBAL SEQUENCE NUMBER THAT IS SUBSEQUENT TO THE FIRST   │
│ GLOBAL SEQUENCE NUMBER                                          │
│ 725                                                             │
└─────────────────────────────────────────────────────────────────┘
                                 ↓
┌─────────────────────────────────────────────────────────────────┐
│ INCREMENTING, BASED ON THE FIRST ENTRY IN THE DATA STRUCTURE    │
│ AND THE SECOND ENTRY IN THE DATA STRUCTURE, THE ELEMENT STORED  │
│ BY THE FIRST DATABASE REPLICA BY A FIRST AMOUNT ASSOCIATED      │
│ WITH THE FIRST OPERATION AND A SECOND AMOUNT ASSOCIATED WITH    │
│ THE SECOND OPERATION                                            │
│ 730                                                             │
└─────────────────────────────────────────────────────────────────┘
                                 ↓
┌─────────────────────────────────────────────────────────────────┐
│ INCREMENTING, BASED ON THE FIRST ENTRY IN THE DATA STRUCTURE    │
│ AND THE SECOND ENTRY IN THE DATA STRUCTURE, THE ELEMENT STORED  │
│ BY THE SECOND DATABASE REPLICA BY THE FIRST AMOUNT ASSOCIATED   │
│ WITH THE FIRST OPERATION AND THE SECOND AMOUNT ASSOCIATED WITH  │
│ THE SECOND OPERATION                                            │
│ 735                                                             │
└─────────────────────────────────────────────────────────────────┘
```

CONFLICT-FREE REPLICATED DATA TYPES IN A DATABASE

BACKGROUND

Many companies and other organizations operate computer networks that interconnect numerous computing systems to support their operations, such as where computing systems are co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

Many public data center operators, such as service providers who operate service provider networks, offer their customers a variety of resources as services. For example, one popular set of services involve databases, where customers may utilize various types of databases such as relational databases often used by for transactional applications, non-relational databases for internet-scale applications, data warehouses for analytics, in-memory data stores for caching and/or real-time workloads, graph databases for building applications with highly-connected data, time series databases for measuring changes over time, ledger databases to maintain a complete and verifiable record of transactions, etc.

BRIEF DESCRIPTION OF DRAWINGS

Various embodiments in accordance with the present disclosure will be described with reference to the following drawings.

FIG. 7 is a flow diagram illustrating operations of a method of managing concurrent database operations in a database with CRDTs according to some embodiments.

DETAILED DESCRIPTION

Various embodiments of methods, apparatus, systems, and non-transitory computer-readable storage media for deploying conflict-free replicated data types (CRDTs) in a replicated database are described. At a high level, a CRDT is a data type that allows certain concurrent operations across database replicas to be ignored. Deploying CRDTs in a replicated database allows those CRDT variables to eventually become consistent across replicas without any complex concurrency control so long as each of the replicas eventually executes each of the operations on the CRDT. Because CRDTs are suitable for a relatively limited class of problems (e.g., related to commutativity and other properties of CRDTs), implementing CRDTs in a database that supports a broader range of data types while still realizing the reduced concurrency overhead of CRDTs can be challenging. According to some embodiments, CRDTs are implemented as a data type within a database that supports many other data types (e.g., integers, strings, objects, floats, etc.). The concurrency mechanisms of the database are implemented such that managing concurrent conflicts of CRDT-typed data is eliminated for certain CRDT-operations resulting in low-latency and high-throughput for such operations on the database.

Figure 1:
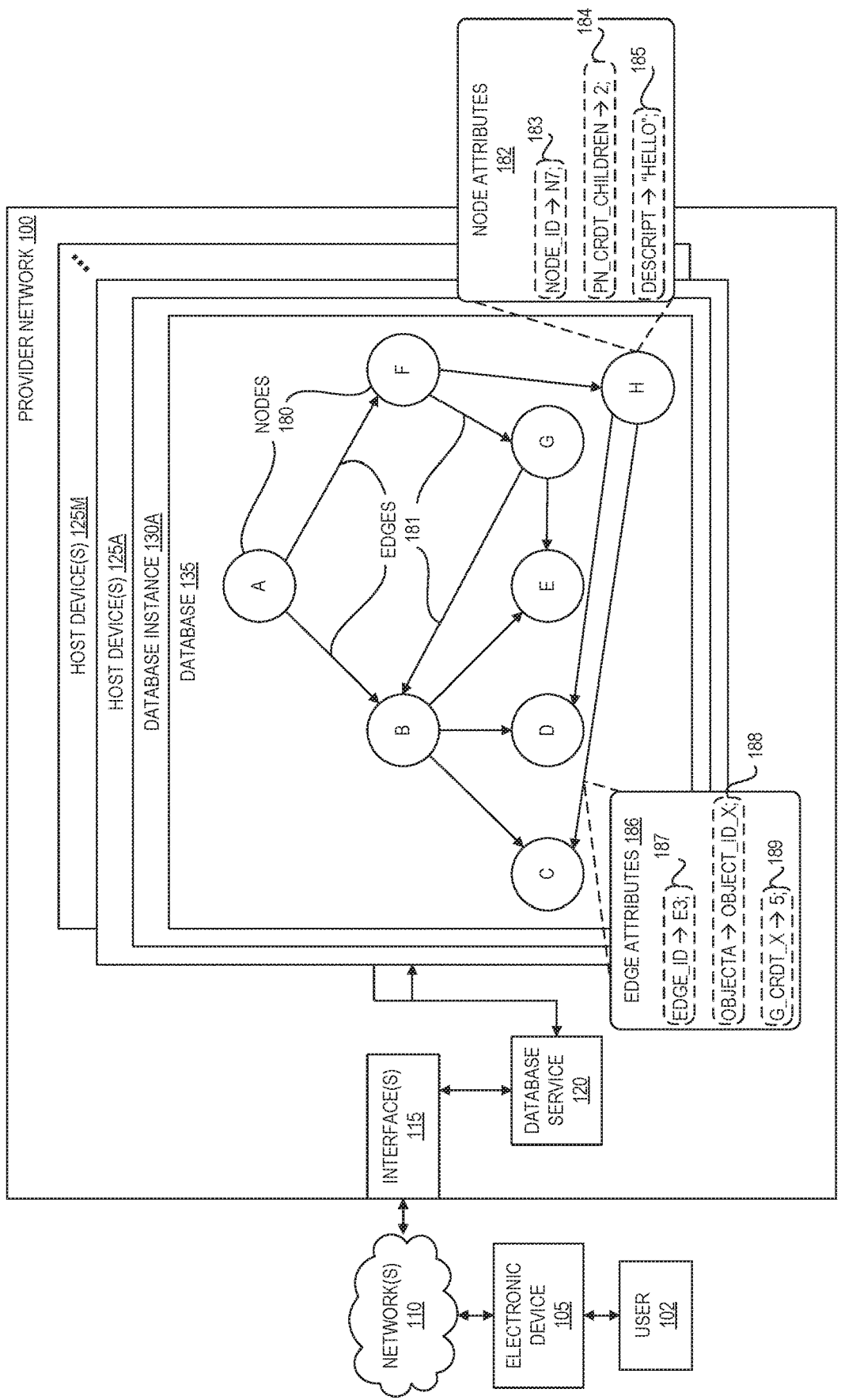
FIG. 1 is a diagram illustrating an environment for incorporating conflict-free replicated data types (CRDTs) in a database according to some embodiments.

FIG. 1 is a diagram illustrating an environment for incorporating CRDTs in a database according to some embodiments. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, a database service that can run queries involving data and/or store data, etc. The users 102 (or "customers") of provider networks 100 may utilize one or more user accounts that are associated with a customer account, though these terms may be used somewhat interchangeably depending upon the context of use. Users 102 may interact with a provider network 100 via a client electronic device 105 across one or more intermediate networks 110 (e.g., the internal via one or more interface(s) 115, such as through use of application programming interface (API) calls, via a console implemented as a website or application, etc. The interface(s) 115 may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S)

that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code (e.g., a query) to be executed by the provider network, which in turn utilizes a compute instance to execute the code (typically without the user having any control of or knowledge of the underlying compute instance(s) involved).

One such service is a database service 120. The database service 120 may be implemented as one or more software modules executed by one or more computing devices of a provider network 100. The database service 120 may be a managed service that makes it easy for users to set up, operate, and scale databases in the provider network 100 in the form of database instances 130A-130M. The database service 120 may rely on the virtualization techniques described above to allocate the compute and storage resources to provide a database instance 130. For example, the database service 120 may provision resources of one or more host devices 125A to host the database instance 130A. The database service 120 may provide resizable capacity while managing time-consuming database administration tasks. The database service 120 may provide one or more of a variety of database engines (e.g., relational database engines such as MySQL, MariaDB, Oracle™, SQL Server, PostgreSQL, etc., and/or non-relational database engines) allowing existing code, applications, and/or tools to work seamlessly with databases provided by the database service 120. In some embodiments, the database service 120 may perform administrative tasks such as automatically backing up databases, upgrading and/or patching database software, scaling the compute resources or storage capacity associated with its database instances, etc.

The user 102 of the provider network 100 may interact with the database service 120 to implement one or more database instances 130, which may include the user 102 utilizing a console of a web-based application to issue one or more requests to an endpoint associated with the database service 120 indicating the user's 102 desire to launch/configure one or more database instances 130. A management engine or controller (not illustrated) of the database service 120 may then, in response, perform operations to obtain compute resources (e.g., VMs executed by host device(s) 125) for the database instance(s) 130 within the provider network 100, launch VM images (optionally having code for the database pre-installed), optionally launch or install databases on the host device(s) 125, configure the database instance 130, configure security rules and/or permissions used by the database instance(s) 130 or used for accessing the database instance(s) 130, etc.

Thereafter, database client applications may issue queries to a database instance 130 to read/write data from/to the database. Such database client applications may be executed by electronic devices inside of the provider network 100 (e.g., hosted on a virtual machine) or outside of the provider network 100 and interact with the database instance 130 via the network(s) 110 and interface(s) 115. In some embodiments, the transactions may be sent using HyperText Transfer Protocol (HTTP) messages to endpoint(s) associated with the database instance(s) 130 that provide an HTTP-based interface.

In this example, the database instance 130A includes a graph-based database 135 comprised of nodes and edges (sometimes referred to as links). The database 135 includes nodes 180 (labeled 'A' through 'H'). The database 135 further includes edges 181 that interconnect nodes 180 and may be directed or undirected. As illustrated, the database 135 includes a root node A and is multi-hierarchical (e.g., nodes C and D are below both node B and node H). In this example, objects (e.g., nodes and edges) have an associated set of zero or more attributes. For example, node H has node attributes 182, and the edge between nodes H and C has edge attributes 186. Attributes may be key-value pairs and be of different data types (e.g., primitive data types such as integers, floating point numbers, strings; complex data types such as groups of primitives, dates, objects; etc.). The database 135 may conform to a user-specified schema (not shown) that defines the logical format of the database (e.g., node types, edge types, attribute types per-node and per-edge, node and edge connectivity limitations, etc.). For example, a graph-based database schema may specify that certain node types have a certain set of attributes, certain edge types have certain sets of attributes, etc. A database instance may host other database types. For example, a database instance may host a relational database having a schema that identifies tables and indices and specifies that certain columns or rows in certain tables are of particular data types.

Exemplary CRDTs include the G-Counter (growth-counter) for values that increment, PN-Counter (positive-negative counter) for values that increment and decrement, G-Set (growth set) for sets in which elements are added and not removed, and 2P-Set (two-phase set) for sets in which elements can be added and removed. For example, a G-Counter can support create, delete, increment, and read operations, while a PN-Counter can additionally support a decrement operation. In some embodiments, a CRDT is a state-based object that satisfies several properties. In the following example, IntMax is a simple state-based object used to illustrate the properties of a CRDT. IntMax is defined as:

class IntMax(object):
        def_init_(self):
            self.x=0
        def query(self):
            return self.x
        def update(self, x):
            assert x>=0
            self.x+=x
        def merge(self, other):
            self.x=max(self.x, other.x)

The IntMax object is a CRDT because for CRDT objects a, b, and c, the merge method is associative (e.g., merge (merge(a, b), c)=max(max(a.x, b.x), c.x)=max(a.x, max(b.x, c.x))=merge(a, merge(b, c))), commutative (e.g., merge(a, b)=max(a.x, b.x)=max(b.x, a.x)=merge(b, a)), and idempotent (e.g., merge(a, a)=max(a.x, a.x)=a.x=a), and the update method is increasing (e.g., merge(a, update(a, x))=max(a.x, a.x+x)=a.x+x=update(a, x)). In this example, CRDTs are introduced to the illustrated database 135 as a data type of attributes. The node attributes 182 include an attribute 183 with a key "NODE_ID" and value "N7" of type string, an attribute 184 with a key "PN_CRDT_CHILDREN" and value "2" of type CRDT PN-Counter, and an attribute 185 with a key "DESCRIPT" and value "HELLO" of type string. Similarly, the edge attributes 186 include an attribute 187 with a key "EDGE_ID" and value "E7" of type string, an attribute 188 with a key "OBJECTA" and value "OBJEC- T_ID_X" of some type object, and an attribute 189 with a key "G_CRDT_X" and value "5" of type CRDT G-Counter. The node attributes 182 and edge attributes 187 are referenced in subsequent examples described with reference to FIGS. 3-6. In general, CRDTs may introduced as types of data elements stored by a database (e.g., fields, records, attributes, variables, entries or other references to data).

Figure 2:
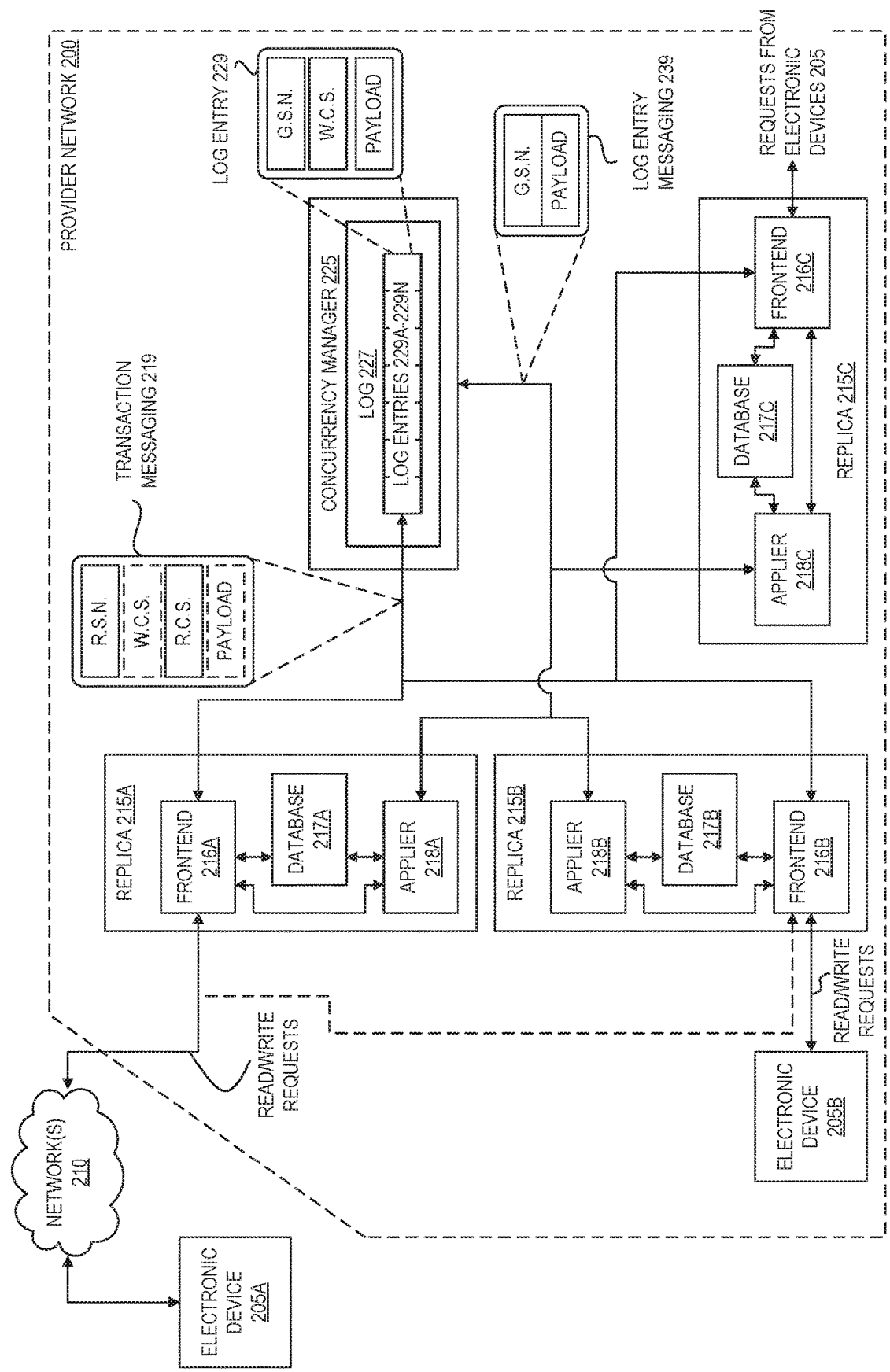
FIG. 2 is a diagram illustrating a replicated database architecture and associated communications according to some embodiments.

FIG. 2 is a diagram illustrating a replicated database architecture and associated communications according to some embodiments. In this architecture, a concurrency manager 225 manages concurrent operation conflicts with a database 217 which is replicated on three replicas 215A, 215B, and 215C. Replication can be used, e.g., to provide redundancy and workload distribution. It should be noted that each replica 215 can have a different version of the database 217 that may or may not be the same version as that of the other replicas as will become clear from the following description. For example, the database 217A of replica 215A may differ from the database 217B of replica 215B. In some embodiments, each replica 215 stores a replica sequence number that reflects the version of its associated database 217.

In some embodiments, the concurrency manager 225 and replicas 215A, 215B, and 215C may be considered a database instance hosted by a provider network 200 (e.g., database instance 130 of FIG. 1). In other embodiments, the replicas 215A, 215B, and 215C can be considered a database instance and the concurrency manager 225 can be a shared service of the provider network 200. In some embodiments, each of the concurrency manager 225 and replicas 215A, 215B, and 215C are separately addressable within the provider network 200 (e.g., via an Internet Protocol (IP)-address or an IP-address and port number).

Replicas 215A, 215B, and 215C vend an interface (e.g., an API) through which users (e.g., electronic device 105) can interact with the database 217. With reference to the graph-based database of FIG. 1, exemplary operations may include creating and removing nodes, creating and removing edges, creating and removing attributes, updating attributes, etc. Note that in some embodiments, the user submits queries to the database 217 and those queries are routed to one of the replicas 215 (e.g., based on a load balancing or routing logic (not shown)). For example, a user of an electronic device 205A can cause the electronic device 205A to submit a request to write a value to an attribute in the database 217. Originating from outside of the provider network 200, that request may be routed via one or more networks 210 (e.g., the internet) and one or more interfaces (not shown) to the replica 215A. Sometime later, the electronic device may submit another request that is routed to replica 215B (as shown in the dashed line). Similarly, an electronic device 205B within the provider network 200 can submit requests that are routed to various replicas 215. Since the database replicas 215 are hidden from client devices/applications and the replicas may have different versions of the database, it is possible for operations to conflict. For example, one operation might set a value to "FOO" to a variable and another operation intended to be later might replace all instances of "FOO" with "BAR." Uncontrolled, different replicas might perform the operations in different orders resulting in an inconsistent view of the database. To avoid this and other undesirable scenarios, the concurrency manager 225 de-conflicts concurrent database operations.

At a high level, the concurrency manager 225 serializes concurrent database operations submitted to replicas 215 to avoid conflicts. Concurrent operations may refer to database operations that arrive at one or more replicas and remain in-flight relative to the underlying database of one or more replicas (e.g., the database 217A of replica 215A). In this context, in-flight means that the operations have not been carried out on the database. Typically, if there is a conflict amongst two concurrent operations, the concurrency manager 225 will permit one and deny the other. More generally, if there is a conflict amongst N concurrent operations on the database, the concurrency manager 225 will permit one of the operations and deny the remaining N−1 operations. In some embodiments, whether there is a conflict depends on the type of the data and the nature of the operation. As will become apparent, CRDTs avoid conflicts for certain operations.

In the architecture illustrated in FIG. 2, replicas 215 submit transactions 219 to the concurrency manager 225, which the concurrency manager 225 can then allow or deny (sometimes referred to as accept or reject). For read operations, a replica 215 submits a read transaction offer 219 to the concurrency manager 225 to check whether the replica has up-to-date data in its respective database 217. The read transaction offer 219 includes a read conflict set ("R.C.S.") that identifies the sources of data in a replica's database 217 for carrying out the requested operation. The read transaction offer 219 further includes the replica sequence number ("R.S.N"). As described below, the concurrency manager 225 can allow or deny the read transaction offer 219 based on the read conflict set and replica sequence number. If the read transaction is denied, the replica 215 that submitted the transaction can issue an error message to the client electronic device 205 that submitted the read request.

For write operations, a replica 215 submits a write transaction offer 219 to the concurrency manager 225 for propagation to the replicas 215, including the replica that submitted the transaction. The write transaction offer 219 may include a read conflict set and read sequence number depending on whether the write operation is dependent on a read operation (e.g., for read-modify-write type operations). The write transaction offer 219 further includes a payload of one or more operations to be carried out to modify the database and a write conflict set ("W.C.S") that identifies the targets of the modifications associated with the operations in the payload. As described below, the concurrency manager 225 can accept or reject the write transaction offer 219 based on the read conflict set and replica sequence number. If the write transaction is denied, the replica 215 that submitted the transaction can issue an error message to the client electronic device 205 that submitted the write request.

In one embodiment, the concurrency manager 225 serializes database operations by maintaining a log 227 (sometimes referred to as a queue or chain). The log 227 includes log entries 229A-229N that reflect accepted transactions that change the database 217. As illustrated, each log entry 229 includes a global sequence number ("G.S.N."), a write conflict set, and a payload. The concurrency manager 225 adds accepted write transactions to the head of the log 227 and assigns each accepted write transactions an incrementing global sequence number. This global sequence number may be considered a version of the database contents. For example, a global sequence number of '5' would reflect the fifth accepted transaction, '6' the sixth accepted transaction, and so on.

Replicas 215 update their version of the database based on log entries in the tail of the log 229. A replica having updated through global sequence number '5' would have content consistent with all database changes up to and including global sequence number '5'. Note that each replica might have a different tail location. For example, the replica 215A might have last committed changes in a log entry 229 with global sequence number '5' while the replica 215B might have last committed changes in a log entry 229 with global sequence number '4'. Thus, the replica 215A would next update from a log entry 229 with global sequence number '6' while the replica 215B would next update from the log entry 229 with global sequence number '5'.

The payload of a log entry 229 reflects a payload of an accepted write transaction offer 219. The payload includes one or more operations a replica 215 would have to perform to transition its database 217 from the previous global sequence number to the next global sequence number. With reference to FIG. 1 as an example, a payload operation may identify the DESCRIPT attribute of node H and a new value to be set or written to that attribute.

The write conflict set of a log entry 229 reflects a write conflict set of an accepted write transaction offer 219. Continuing the above example, the write conflict set would identify the DESCRIPT attribute of node H. Note that certain operations that modify the state of a CRDT variable need not appear in the write conflict set, as described below.

In one embodiment, the concurrency manager 225 can use the log 227 to identify conflicts to determine whether to allow or deny a transaction offer 219 as follows. As noted above, when a replica 215 submits a transaction offer 219 to the concurrency manager 225, the replica 215 includes a read conflict set that identifies the sources of data in a replica's database 217 for carrying out the operations of the transaction and a replica sequence number. The concurrency manager 225 rejects the transaction offer 219 if at least one item in the read conflict set appears in a write conflict set of a log entry 229 having a more recent global sequence number than that of the replica sequence number. Continuing the above example, a log entry assigned global sequence number '5' may have a write conflict set that identifies DESCRIPT attribute of node H. A replica 215 having only updated through the log entry 229 with global sequence number '4' may submit a read transaction offer 219 (or write transaction offer 219 that involves a read-modify-write operation) that identifies DESCRIPT attribute of node H in the read conflict set. To prevent using erroneous or out-of-date data, the concurrency manager 225 denies the transaction offer.

In some embodiments, the API vended by a replica 215 allows an electronic device 205 to provide a unique identifier associated with an operation. Such an identifier can be included within the payload of a transaction offer 219 to provide idempotency guarantees if, for some reason, the database instance is unable to confirm to the electronic device 205 that an operation was allowed even though the operation is reflected in a payload of a log entry 229. In such a case, the concurrency manager 225 can further deny a transaction offer 219 that includes a payload having a unique identifier already present in a payload of a log entry 229 having a more recent global sequence number than that of the replica sequence number.

For a denied read transaction offer 219, the replica 215 that submitted the transaction can issue an error message to the client electronic device 205 that submitted the read request. For a denied write transaction offer 219, the replica 215 that submitted the transaction can issue an error message to the client electronic device 205 that submitted the write request. In either case, the denial from the concurrency manager 225 can include reason for the denial that can be sent in the error message to the client electronic device 205.

For an allowed read transaction offer 219, the replica 215 that submitted the transaction can read the data from its local database 217 and return the data to the client electronic device 205 that submitted the read request. For an allowed write transaction offer 219, the concurrency manager 225 adds a new entry 229 to the head of the log 227, assigns a new global sequence number to the new entry 229, and adds the write conflict set and payload submitted with the write transaction offer to the new entry 229.

The changes in the payload of an allowed write transaction offer 219 are committed to the database 217 of a given replica 215 via log entry messaging 239. Replicas 215 receive log entry payloads from the concurrency manager 225 to update the replica's version of the database. The replicas 215 may submit requests to the concurrent manager 225 for a next log entry payload for that replica, or the concurrency manager 225 may occasionally push the next log entry payload for a given replica 215 to the replica 215. In some embodiments, the concurrency manager 225 identifies the next payload to be sent to the replica either based on a submission of the replica serial number by the replica or by tracking the global sequence number of the last payload sent to the replica. In some embodiments, a log entry message 239 sent from the concurrency manager 225 to a replica 215 includes a global sequence number of the log entry and the associated payload.

Once a replica 215 has received data from a log entry, the replica 215 can perform the operations included in the payload and update its replica sequence number to that of the global sequence number as described below with reference to FIG. 6.

In the illustrated embodiment, replicas 215 include a frontend 216 and an applier 218. The frontend 216 of a replica 215 accesses the database 217 to perform the above described operations including building read/write conflict sets for submission in transaction offers 219 to the concurrency manager 225 and retrieving data in response to allowed read transaction offers 219. The applier 218 of a replica 215 accesses the database 217 to perform the above described operations including applying operations in payloads received from the concurrency manager 225 to the database 217.

Frontends 216 and appliers 218 may be implemented as one or more software modules executed by respective replica host devices (e.g., host device(s) 125). For example, frontend 216 and applier 218 may be separate threads of a multi-threaded replica application. In some embodiments, databases 217A, 217B, and 217C may be stored in respective replica host device storage (e.g., storage drives locally (e.g., via an interconnect) or network-attached to host device(s) 125). The concurrency manager 225 may be implemented as one or more software modules executed by a host device (e.g., host device(s) 125). In some embodiments, one or more of the frontend 216, the applier 218, and the database 217 of a replica 215 vend an HTTP-based communications interface.

Figure 3:
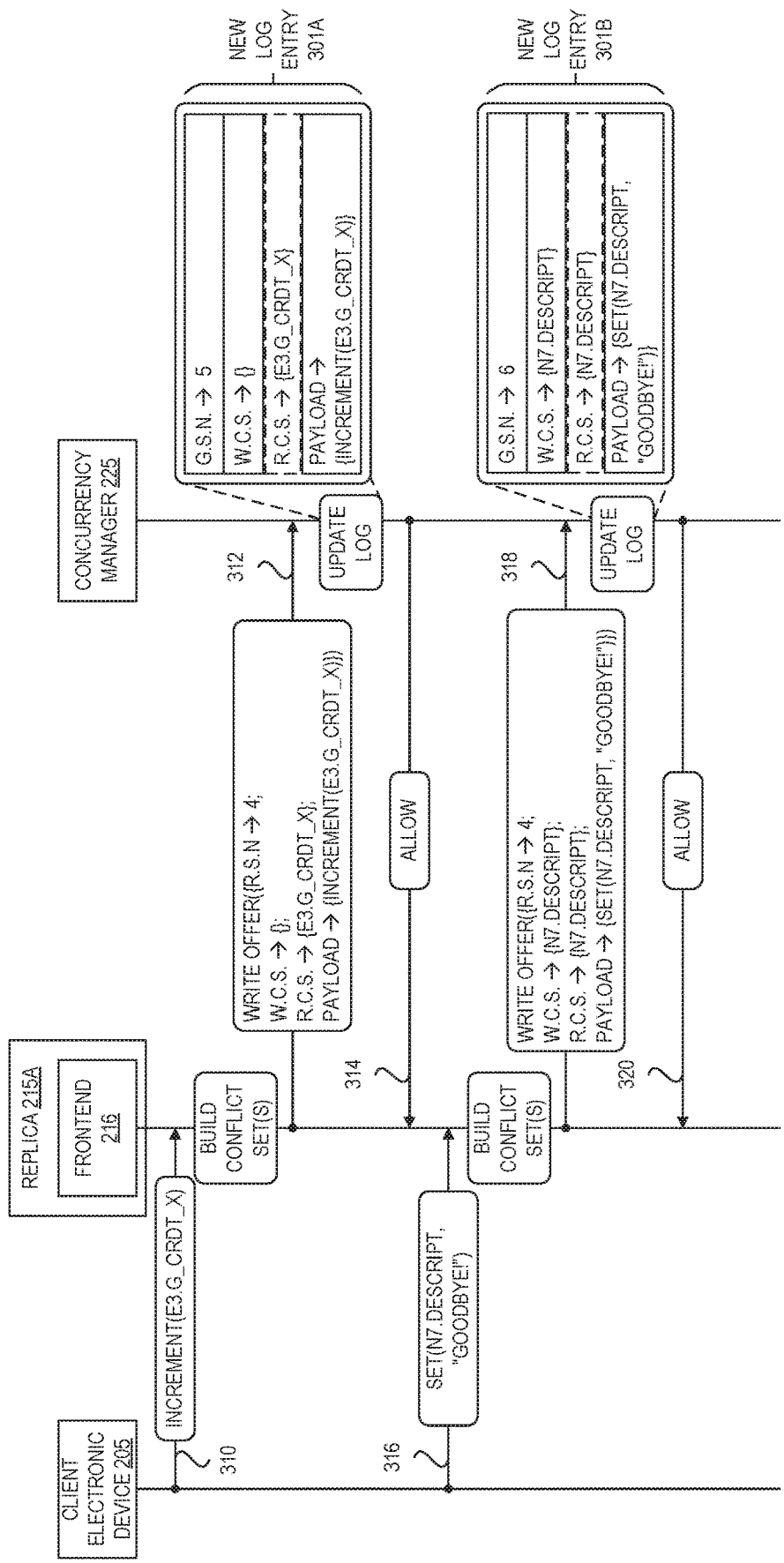
FIG. 3 is a diagram illustrating an exemplary call flow for database operations of CRDT and non-CRDT data types in the architecture of FIG. 2 according to some embodiments.

FIG. 3 is a diagram illustrating an exemplary call flow for database operations of CRDT and non-CRDT data types in the environment of FIG. 2 according to some embodiments. As illustrated, messaging in FIG. 3 is between a client electronic 205 and a replica 215 (or replica frontend 216) and between the replica 215 and the concurrent manager 225. The replica has a replica sequence number of '4'. Messages 310-314 relate to update operations performed on a CRDT. Messages 316-320 relate to update operations performed on other, non-CRDT data types.

The client electronic device 205 sends a message 310 to the replica 215. The message 310 includes a request to increment a target variable of type CRDT (i.e., the "G_CRDT_X" G-Counter CRDT of the edge "E3" of FIG. 1). The replica 215 (e.g., the frontend 216) builds conflict sets to submit in a write transaction offer to the concurrency manager 225. The type of the target of the operation may be included in the message 310 or determined by the replica 215 by reading its associated database 217 or an associated schema. Note that if the replica 215 reads its associated database 217 and determines the target does not exist (e.g., because it has yet to commit an associated create operation), the replica 215 can return an error message (not shown) to the client electronic device 205. Because the type of the target is a CRDT, the replica 215 identifies the target—E3.G_CRDT_X—in the read conflict set but not in the write conflict set.

The replica 215 sends a message 312 to the concurrency manager 225. The message 312 includes a write transaction offer having the constructed write and read conflict sets, a payload that includes the operation to increment the target variable, and the replica sequence number.

In this example, the next global sequence number to be assigned is '5,' indicating the replica 215 with replica sequence number '4' is current relative to entries in the log. As a result, the concurrency manager 225 identifies no conflicts (e.g., because no items in the submitted read conflict set appear in a write conflict set of a log entry having a more recent global sequence number than that of the replica sequence number) and thus updates a log adding a new log entry 301A based on the contents of the message 312 (optionally including the read conflict set). The concurrency manager 225 sends a message 314 to the replica 215 indicating that the transaction offer was allowed.

Sometime later and before the replica 215 has updated its replica sequence number to '5', the client electronic device 205 sends a message 316 to the replica 215. The message 316 includes a request to set a target variable of a non-CRDT data type (i.e., the "DESCRIPT" string of the node "N7" of FIG. 1). The replica 215 (e.g., the frontend 216) builds conflict sets to submit in a write transaction offer to the concurrency manager 225. The type of the target of the operation may obtained as described elsewhere herein. Because the type of the target is not a CRDT, the replica 215 identifies the target—N7.DESCRIPT—in a write conflict set.

The replica 215 sends a message 318 to the concurrency manager 225. The message 318 includes a write transaction offer having the constructed write and read conflict sets, a payload that includes the operation to set the string, and the replica sequence number.

In this example, the next global sequence number to be assigned is '6,' indicating the replica 215 is not current relative to entries in the log. As a result, the concurrency manager 225 checks for conflicts as described elsewhere herein and, identifying no conflicts, updates the log adding a new log entry 301B based on the contents of the message 318 (optionally including the read conflict set). The concurrency manager 225 sends a message 320 to the replica 215 indicating that the transaction offer was allowed.

Figure 4:
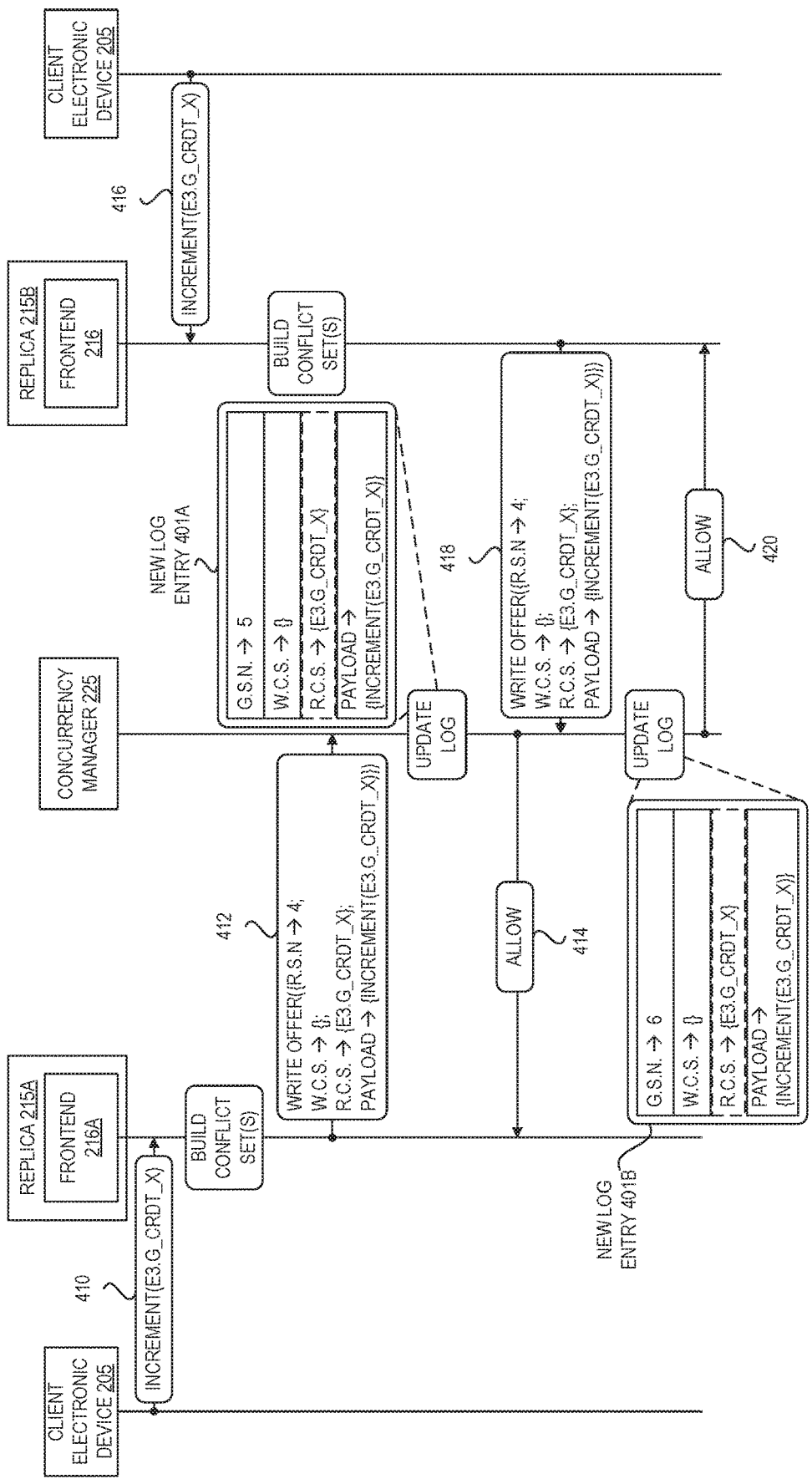
FIG. 4 is a diagram illustrating an exemplary call flow for certain concurrent database operations with CRDTs in the architecture of FIG. 2 according to some embodiments.

FIG. 4 is a diagram illustrating an exemplary call flow for certain concurrent database operations with CRDTs in the architecture of FIG. 2 according to some embodiments. FIG. 4 illustrates how concurrency between operations that affect the state of a variable of CRDT type can be ignored by the concurrency manager 225. As illustrated, messaging in FIG. 4 is between a client electronic device 205 and a replica 215A (or replica frontend 216A) and between the replica 215A and the concurrent manager 225. Furthermore, messaging is between the client electronic device 205 and a replica 215B (or replica frontend 216B) and between the replica 215B and the concurrent manager 225. The replica 215A and 215B have a replica sequence number of '4'. Messages 410-414 relate to an increment operation associated with a variable of type CRDT. Messages 416-420 relate to an increment operation performed on the same variable.

The client electronic device 205 sends a message 410 that is routed to the replica 215A. The message 410 includes a request to increment a target variable of type CRDT (i.e., the "G_CRDT_X" G-Counter CRDT of the edge "E3" of FIG. 1). The replica 215A (e.g., the frontend 216A) builds conflict sets to submit in a write transaction offer to the concurrency manager 225. The type of the target of the operation may obtained as described elsewhere herein. Because the type of the target is a CRDT, the replica 215A identifies the target—E3.G_CRDT_X—in the read conflict set but not in the write conflict set.

The replica 215A sends a message 412 to the concurrency manager 225. The message 412 includes a write transaction offer having the constructed write and read conflict sets, a payload that includes the operation to increment the target variable, and the replica sequence number.

As before, the next global sequence number to be assigned is '5,' indicating the replica 215A with replica sequence number '4' is current relative to entries in the log. As a result, the concurrency manager 225 identifies no conflicts as described elsewhere herein and thus updates a log adding a new log entry 401A based on the contents of the message 412 (optionally including the read conflict set). The concurrency manager 225 sends a message 414 to the replica 215A indicating that the transaction offer was allowed.

Concurrently, the client electronic device 205 sends a message 416 that is routed to the replica 215B. The message 416 includes a request to increment the same target variable as in message 410. The replica 215B (e.g., the frontend 216B) builds conflict sets to submit in a write transaction offer to the concurrency manager 225. The type of the target of the operation may obtained as described elsewhere herein. Because the type of the target is a CRDT, the replica 215B identifies the target—E3.G_CRDT_X—in the read conflict set but not in the write conflict set.

The replica 215B sends a message 418 to the concurrency manager 225. The message 418 includes a write transaction offer having the constructed write and read conflict sets, a payload that includes the operation to increment the target variable, and the replica sequence number.

Here, the next global sequence number to be assigned is '6,' indicating the replica 215B with replica sequence number '4' is not current relative to entries in the log. As a result, the concurrency manager 225 checks for conflicts as described elsewhere herein and, identifying no conflicts, updates the log adding a new log entry 401B based on the contents of the message 418 (optionally including the read conflict set). The concurrency manager 225 sends a message 420 to the replica 215B indicating that the transaction offer was allowed.

Of note, the concurrency manager 225 permitted two concurrent operations on a target of type CRDT. By comparison, if the concurrent operation was on a variable of a non-CRDT data type, whichever write transaction offer was received second by the concurrency manager 225 because the first one introduced a log entry including a write conflict set that identified the variable of the non-CRDT data type (e.g., as shown in the new log entry 301B of FIG. 3).

Figure 5:
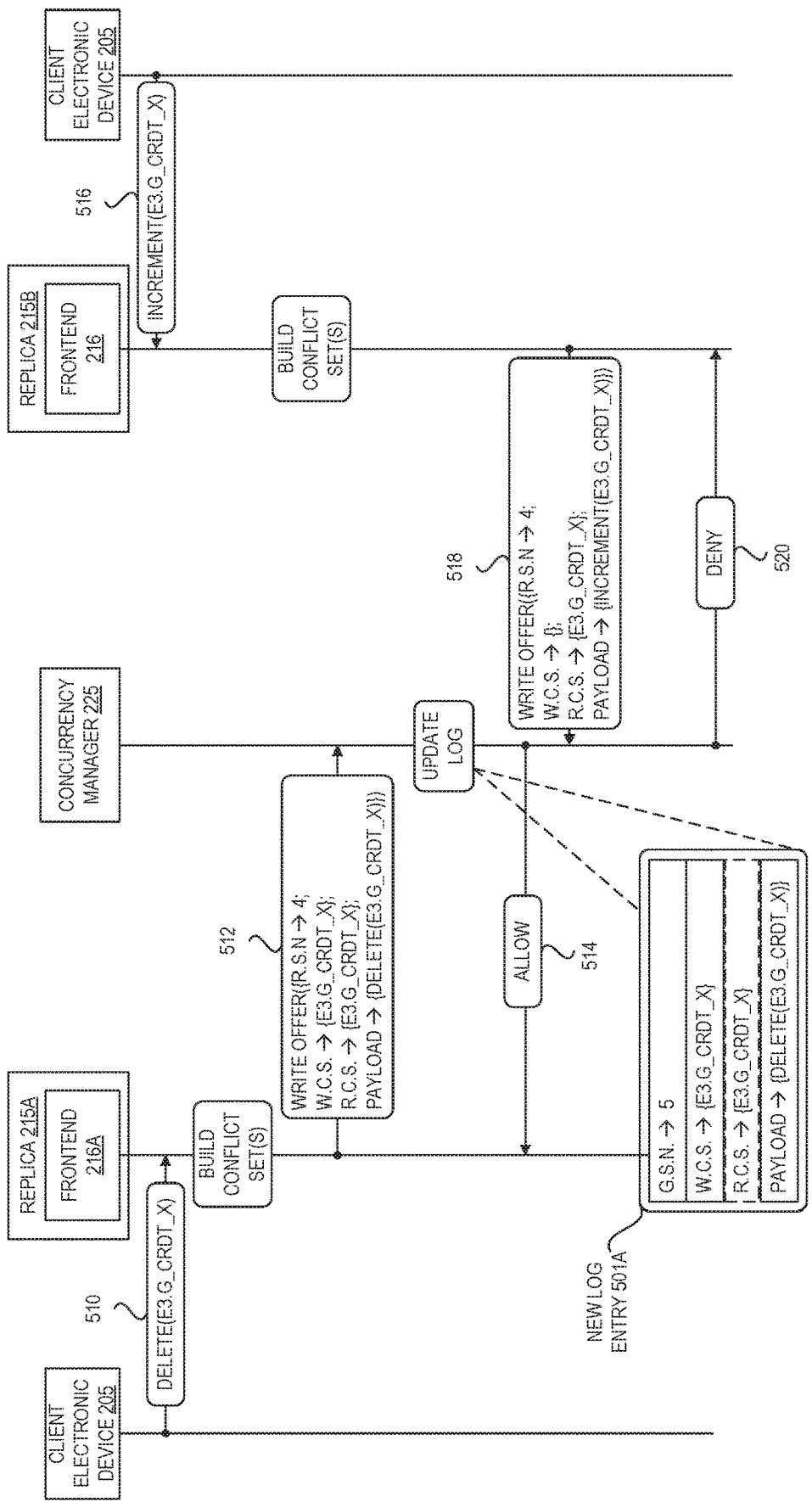
FIG. 5 is a diagram illustrating an exemplary call flow for certain other concurrent database operations with CRDTs in the architecture of FIG. 2 according to some embodiments.

FIG. 5 is a diagram illustrating an exemplary call flow for certain other concurrent database operations with CRDTs in the architecture of FIG. 2 according to some embodiments.

FIG. 5 illustrates how concurrency between operations that affect the state of the database (and indirectly a variable of CRDT type) may need to be managed by the concurrency manager 225. As illustrated, messaging in FIG. 5 is between similar pairs of entities as described above for FIG. 4. Again, the replicas 215A and 215B have a replica sequence number of '4'. Messages 510-514 relate to a delete operation associated with a variable of type CRDT. Messages 516-520 relate to an increment operation performed on the same variable.

The client electronic device 205 sends a message 510 that is routed to the replica 215A. The message 510 includes a request to delete an attribute of type CRDT (i.e., the "G_CRDT_X" G-Counter CRDT of the edge "E3" of FIG. 1). The replica 215A (e.g., the frontend 216A) builds conflict sets to submit in a write transaction offer to the concurrency manager 225. Although the operation removes an attribute of CRDT type, the operation changes the state of the database. As a result, the replica 215A identifies the target—E3.G_CRDT_X—in the write conflict set.

The replica 215A sends a message 512 to the concurrency manager 225. The message 512 includes a write transaction offer having the constructed write and read conflict sets, a payload that includes the operation to delete the target attribute, and the replica sequence number.

As before, the next global sequence number to be assigned is '5,' indicating the replica 215A with replica sequence number '4' is current relative to entries in the log. As a result, the concurrency manager 225 identifies no conflicts as described elsewhere herein and thus updates a log adding a new log entry 501A based on the contents of the message 512 (optionally including the read conflict set). The concurrency manager 225 sends a message 514 to the replica 215A indicating that the transaction offer was allowed.

Concurrently, the client electronic device 205 sends a message 516 that is routed to the replica 215B. The message 516 includes a request to increment the value of the target attribute identified in message 510. The replica 215B (e.g., the frontend 216B) builds conflict sets to submit in a write transaction offer to the concurrency manager 225. The type of the target of the operation may obtained as described elsewhere herein. Because the type of the target is a CRDT, the replica 215B identifies the target—E3.G_CRDT_X—in the read conflict set but not in the write conflict set.

The replica 215B sends a message 518 to the concurrency manager 225. The message 518 includes a write transaction offer having the constructed write and read conflict sets, a payload that includes the operation to increment the variable, and the replica sequence number.

Here, the next global sequence number to be assigned is '6,' indicating the replica 215B with replica sequence number '4' is not current relative to entries in the log. As a result, the concurrency manager 225 checks for conflicts and identifies one. In particular, the read conflict set in the message 518 includes an item in the write conflict set of log entry 501A, and the log entry 501A has a global sequence number '5' that is greater than the replica sequence number '4' in the message 518. The concurrency manager 225 sends a message 520 to the replica 215B indicating that the transaction offer was denied.

As explained above, operations that affect the state of a variable of CRDT type can avoid the overhead associated with managing concurrency (see FIG. 4) while operations that affect the state of the database (and indirectly a variable of CRDT type) may still requirement concurrency management (see FIG. 5). In some embodiments, operations that create or delete a variable of CRDT type within a database are operations that affect the state of a database, while operations that update a variable of CRDT type (e.g., increment, decrement, add set member, remove set member) are operations that affect the state of a variable of CRDT type.

Figure 6:
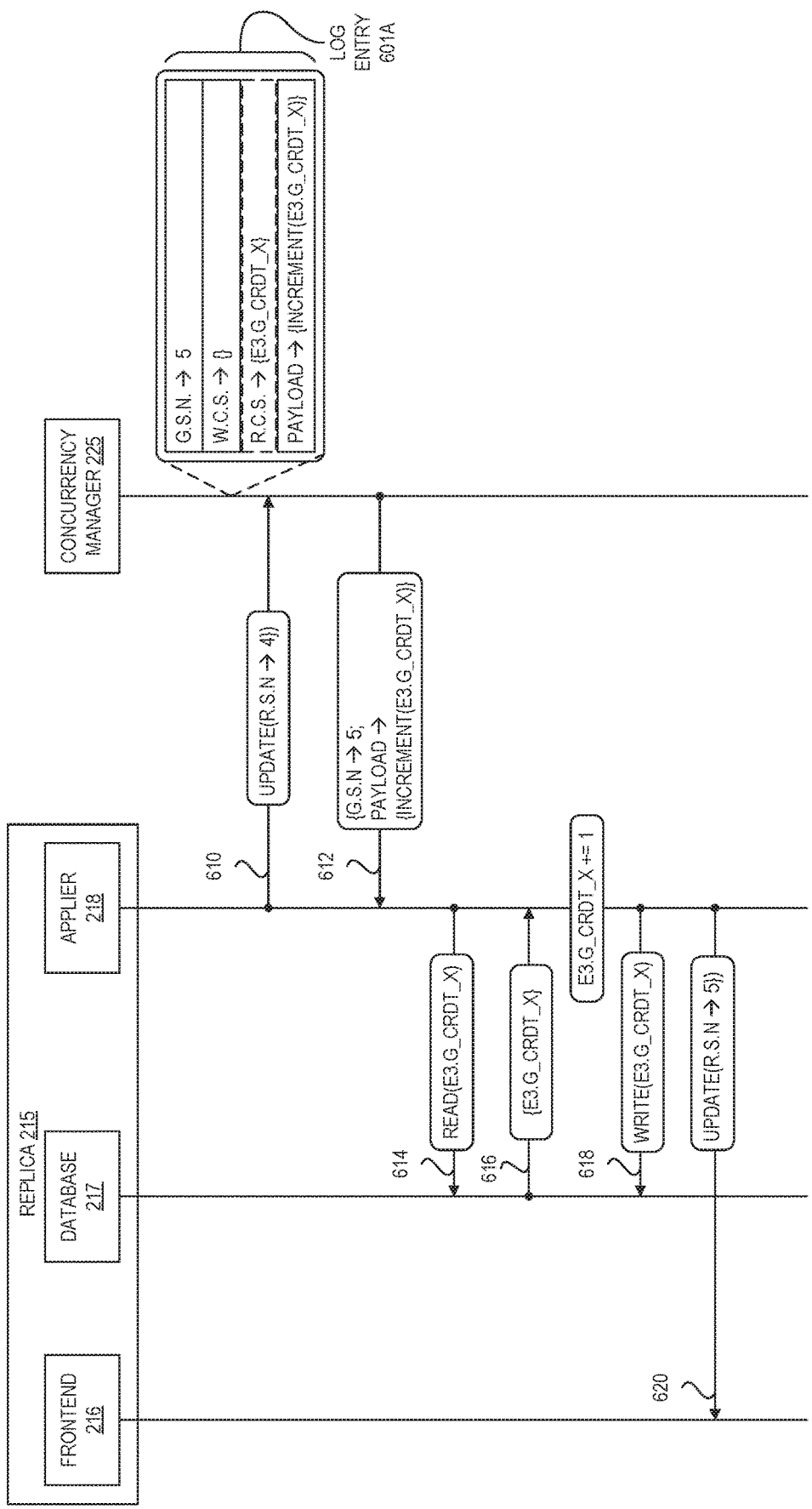
FIG. 6 is a diagram illustrating an exemplary call flow for committing database operations with CRDTs in the architecture of FIG. 2 according to some embodiments.

FIG. 6 is a diagram illustrating an exemplary call flow for committing database operations with CRDTs in the architecture of FIG. 2 according to some embodiments. As illustrated, messaging in FIG. 6 is between a replica 215 and the concurrency manager 225, and the replica includes the frontend 216, the database 217, and the applier 218. The concurrency manager 225 includes a log entry 601A having a payload that includes an operation to increment a target variable of type CRDT (i.e., the "G_CRDT_X" G-Counter CRDT of the edge "E3" of FIG. 1).

The applier 218 sends a message 610 to the concurrency manager 225. The message includes the replica sequence number that reflects the current version of the database 217 of the replica 215. In this example, the replica 215 has a replica sequence number of '4.' The concurrency manager 225 uses the replica sequence number to identify the next global sequence number and associated payload to send to the replica 215. In this example, the next global sequence number '5' is associated with the log entry 601A includes the global sequence number '5'. In other embodiments, the concurrency manager 225 may track the last global sequence number sent to each replica. In such embodiments, the replica sequence number may be omitted from the message 610 or the message 610 may be omitted and the concurrency manager 225 can occasionally push the payload of the next global sequence number to the replica.

The concurrency manager 225 sends a message 612 to the applier 218 (e.g., a log entry message 239) that includes the payload associated with the next global sequence number and, optionally, the next global sequence number.

The applier 218 performs the operations contained in a payload on the database 217. In this example, the payload includes the single operation to increment the value of G_CRDT_X. The applier 218 sends a message 614 to the database 217 to read the current value of G_CRDT_X, which the database 217 returns to the applier 218 in a message 616. As illustrated, the applier 218 increments the value by one (although in practice, the counter may be incremented by some other user-specified value). The applier 218 then sends a message 618 to the database 217 to write the incremented value of G_CRDT_X. As an alternative to messages 614-618 being performed for each update, the replica 215 can defer or eliminate read transactions with the database 217 by queueing multiple operations against the data. For example, upon receiving message 612, the applier 218 can write an indication of the operation to the database 217 to queue it against the data (G_CRDT_X) without reading the data. Over time, the applier 218 may queue many operations against the data (e.g., ten increment operations). When the data is accessed, e.g., by the frontend 216, the frontend can also access the queued operations, perform all of the queued operations on the data, write the updated data to the database, and clear the queued operations, thereby avoiding performing a read transaction for each update.

In some embodiments, the applier 218 sends a message 620 to the frontend 216 to update the replica sequence number to match the global sequence number of the recently processed payload. In other embodiments, the applier 218 can write the updated replica sequence number to the database 217, and the frontend 216 can obtain the current replica sequence number from the database 217.

In some embodiments, the messaging illustrated in FIGS. 3-6 uses HTTP-based communications. Furthermore, while FIGS. 2-6 contemplate concurrency management via the concurrency manager 225, other techniques to avoid the overhead associated with concurrency management for CRDTs are possible.

FIG. 7 is a flow diagram illustrating operations of a method of managing concurrent database operations in a database with CRDTs according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by host device(s) 125 of the other figures.

The operations include, at block 705, receiving, by a first database replica of a database instance hosted by a provider network, an identifier of a first operation to increment an element stored in the database instance, wherein the element is of type CRDT. Elements may be values associated with fields, records, attributes, variables, entries or other references to data stored by the database. For example, a client electronic device 105, 205 can send an operation to be performed on the database, such as an operation to read data from the database or to write data to the database. Replicas of a database, such as replicas 215 illustrated in FIG. 2, can receive or otherwise obtain client-issued operations via a provider network 200, in some embodiments. In some embodiments, replicas or components thereof vend an API via which client-issued operations can be ingested by the replica. One such API is an HTTP-based interface.

The operations further include, at block 710, inserting a first entry into a data structure comprising a plurality of entries, each entry in the data structure including a global sequence number and at least one pending operation against one or more of a plurality of replicas of the database instance, wherein the plurality of replicas of the database instance includes the first database replica and a second database replica, and wherein the first entry includes the element, the first operation, and a first global sequence number. As explained with reference to FIGS. 2-6, one concurrency management technique involves serializing concurrent operations prior to committing them to replicas of the database. For example, the concurrency manager 225 can maintain a log or other data structure to track changes to the database. As replicas receive client-originating operations, replicas can submit data related to those operations in a transaction to the concurrency manager 225, which in turn can accept or deny transactions offered by the replicas. The sequencing or serialization of operations can be achieved by assigning a global sequence number to accepted transactions as they are added to the data structure, for example. Additional details can be found above with reference to FIGS. 2-6.

The operations further include, at block 715, receiving, by a second database replica of the database instance, an identifier of a second operation to increment the element. As described above for block 705, replicas can receive or otherwise obtain client-issued operations in a variety of ways.

The operations further include, at block 720, determining, based on the first entry in the data structure, that the second operation does not conflict with the second operation. As explained herein, certain concurrent operations on elements of CRDT type can be ignored. One conflict resolution technique entails comparing a variable read in a transaction offered to the concurrency manager 225 to other pending transactions that write to the same variable. For example, replicas can submit a write conflict set with a transaction to the concurrency manager. In the case of CRDTs, prior pending writes to a CRDT element can avoid creating conflicts for certain operations by having the replicas omit such variables from the write conflict set. When the concurrency manager 225 checks write conflict sets for pending transactions that write to a variable when determining whether to accept or reject a subsequent, CRDT elements do not create conflicts. Additional details related to CRDT conflict checks are provided above.

The operations further include, at block 725, inserting a second entry into the data structure, wherein the second entry includes the variable, the second operation, and a second global sequence number that is subsequent to the first global sequence number. Using the above described concurrency management technique involving a data structure to track changes to the database, since the operations on the CRDT typed variable do not conflict, the second operation can be added to the data structure. Additional details are found above in the descriptions associated with FIGS. 2-6.

The operations further include, at block 730, incrementing, based on the first entry in the data structure and the second entry in the data structure, the variable stored by the first database replica by a first amount associated with the first operation and a second amount associated with the second operation. As described with reference to FIGS. 2 and 6, database changes tracked in the data structure that passed concurrency checks can be sent out to the replicas. For example, the concurrency manager 225 can send one or more operations to a replica 215 (e.g., either in response to a request from the replica or occasionally at the initiation of the concurrency manager). Upon receiving the operations, the replica can perform the associated operations on its local copy of the database.

The operations further include, at block 735, incrementing, based on the first entry in the data structure and the second entry in the data structure, the variable stored by the second database replica by the first amount associated with the first operation and the second amount associated with the second operation. As described above for block 730, replicas can receive changes from the concurrency manager and enact those changes on the replica's local copy of the database.

Figure 8:
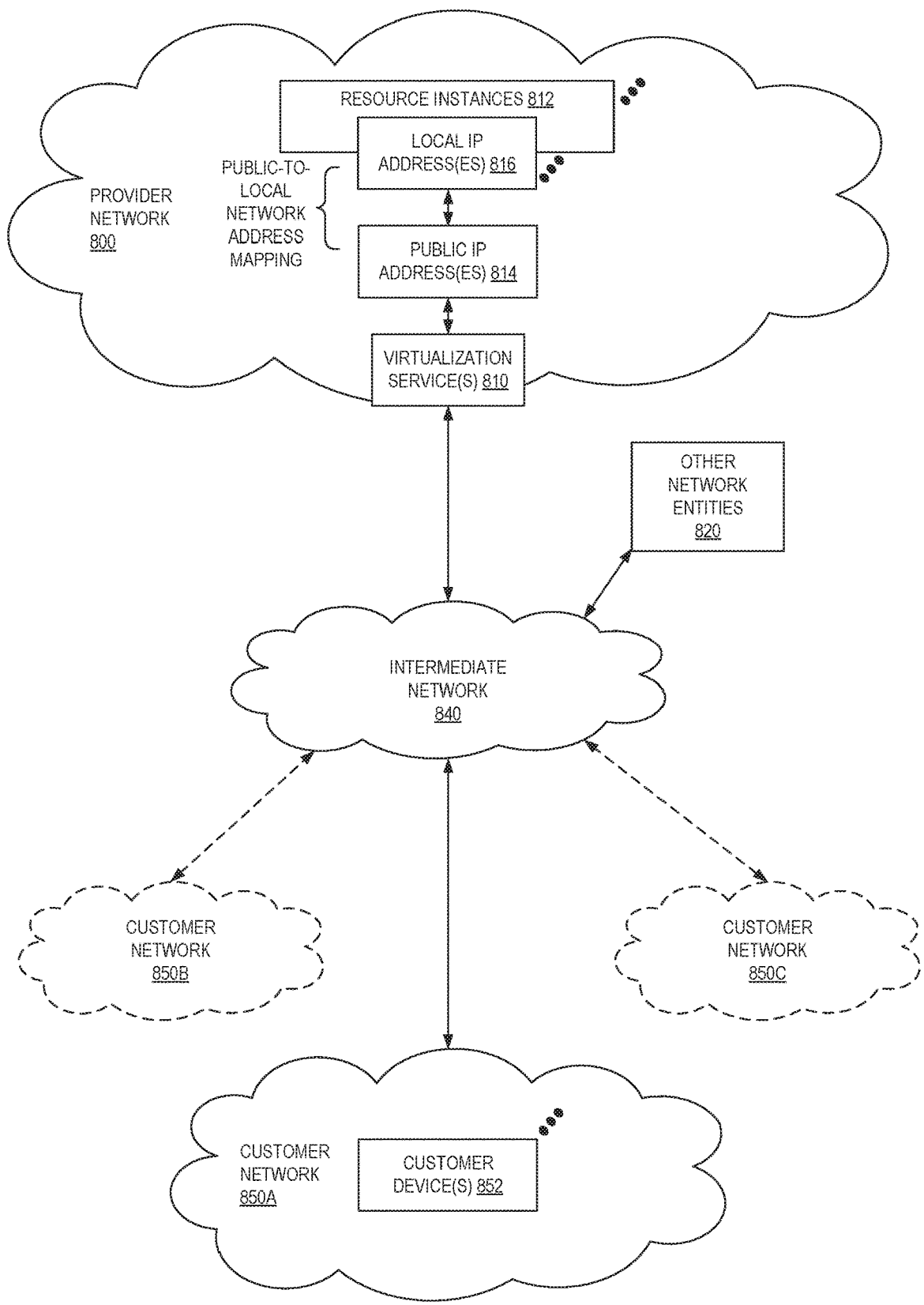
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
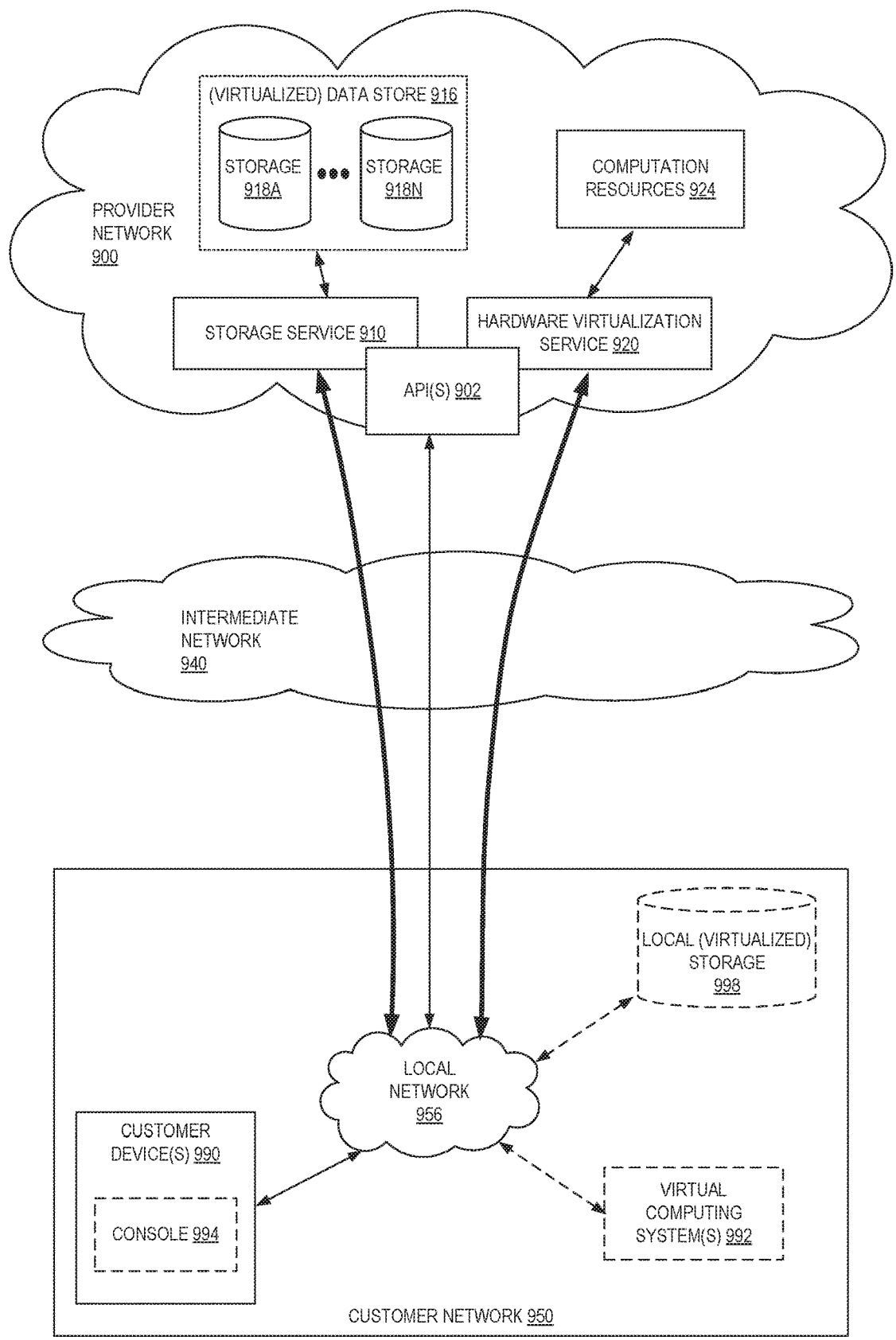
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Figure 10:
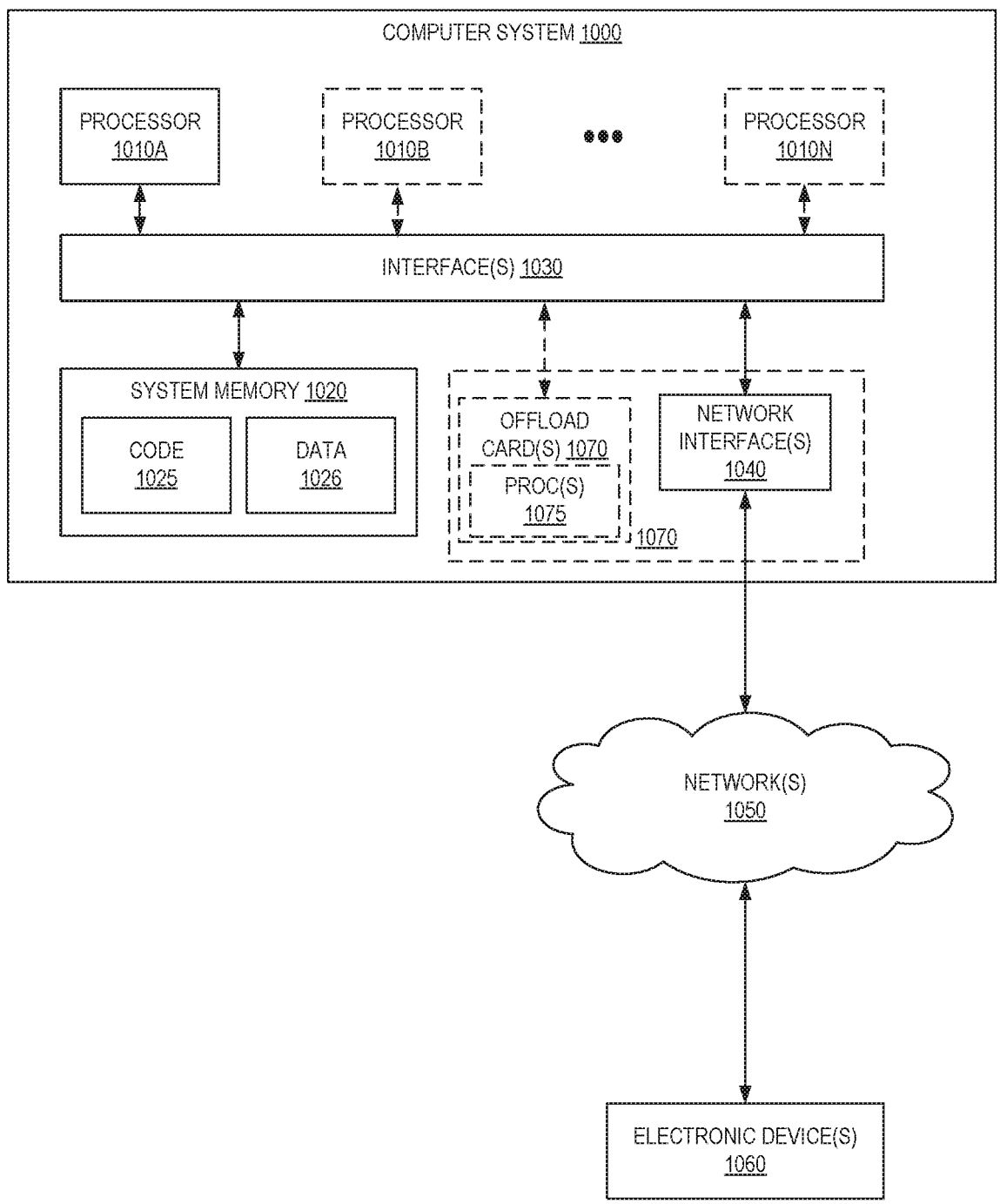
FIG. 10 is a block diagram illustrating an example computer system that may be used in some embodiments.

In some embodiments, a system that implements a portion or all of the techniques for incorporating CRDTs into a database as described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Furthermore, a computer-accessible medium may include transmission media or signals such as electrical, electromagnetic, or digital signals, conveyed via a communication medium such as a network and/or a wireless link, such as may be implemented via network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Furthermore, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 125A-125M) may be used to indicate that there can be one or multiple instances of the referenced entity in various embodiments, and when there are multiple instances, each does not need to be identical but may instead share some general traits or act in common ways. Furthermore, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, by a first database replica of a graph-based database hosted by a provider network, an identifier of a first operation to perform on an element stored in the graph-based database, wherein the element is of a conflict-free replicated data type;
   inserting a first entry into a data structure comprising a plurality of entries, wherein the first entry identifies the element, the first operation, and a first global sequence number;
   receiving, by a second database replica of the database, an identifier of a second operation to perform on the element;
   determining that the second operation does not conflict with the first operation, wherein the first operation and the second operation have yet to be performed by both the first database replica and the second database replica, wherein determining that the second operation does not conflict with the first operation is based on the first entry in the data structure;
   inserting a second entry into the data structure, wherein the second entry identifies the element, the second operation, and a second global sequence number that is subsequent to the first global sequence number;
   performing the first operation and the second operation on the element stored by the first database replica; and
   performing the first operation and the second operation on the element stored by the second database replica.

2. The computer-implemented method of claim 1, further comprising:
   updating a replica sequence number of the first database replica to match the second global sequence number; and
   updating a replica sequence number of the second database replica to match the second global sequence number.

3. The computer-implemented method of claim 1, wherein each entry in the data structure identifies a global sequence number and at least one pending operation against one or more of a plurality of replicas of the graph-based database.

4. The computer-implemented method of claim 1, wherein determining that the second operation does not conflict with the first operation comprises:
   identifying a set of entries in the data structure having a global sequence number greater than a replica sequence number of the second database replica; and
   determining, for each entry in the set, a write conflict set of the entry does not include the element.

5. The computer-implemented method of claim 1, wherein determining that the second operation does not conflict with the first operation comprises:
   receiving a replica sequence number of the second database replica and a read conflict set that identifies the element;
   identifying a set of entries in the data structure having a global sequence number greater than the replica sequence number of the second database replica; and
   determining, for each entry in the set, a write conflict set of the entry does not include an entry in the read conflict set.

6. The computer-implemented method of claim 1, further comprising:
   receiving an identifier of a third operation to perform on the element, wherein the third operation is to delete the element;
   receiving an identifier of a fourth operation to perform on the element;
   determining that the fourth operation conflicts with the third operation; and
   causing an error to be sent to an originator of the fourth operation.

7. The computer-implemented method of claim 1, wherein the graph-based database is a multi-hierarchical graph-based database, the conflict-free replicated data type is a primitive type of the multi-hierarchical graph-based database, and the element is an attribute of at least one of a node or an edge of a graph of the graph-based database.

8. The computer-implemented method of claim 1, wherein the graph-based database is a database instance managed by a storage service of the provider network.

9. A system comprising:
   a storage service of a provider network implemented by a first one or more electronic devices;
   a database instance implemented by a second one or more electronic devices and managed by the storage service, the database instance hosting a graph-based database, the database instance including instructions that upon execution cause the database instance to:
      receive, by a first database replica of the database instance, an identifier of a first operation to perform on an element stored in the graph-based database, wherein the element is of a conflict-free replicated data type;
      insert a first entry into a data structure comprising a plurality of entries, wherein the first entry identifies the element, the first operation, and a first global sequence number;
      receive, by a second database replica of the database instance, an identifier of a second operation to perform on the element;
      determine that the second operation does not conflict with the first operation, wherein the first operation and the second operation have yet to be performed by both the first database replica and the second database replica, wherein to determine that the second operation does not conflict with the first operation is based on the first entry in the data structure;

insert a second entry into the data structure, wherein the second entry identifies the element, the second operation, and a second global sequence number that is subsequent to the first global sequence number;

perform the first operation and the second operation on the element stored by the first database replica; and perform the first operation and the second operation on the element stored by the second database replica.

10. The system of claim 9, the database instance including further instructions that upon execution cause the database instance to:

update a replica sequence number of the first database replica to match the second global sequence number; and update a replica sequence number of the second database replica to match the second global sequence number.

11. The system of claim 9, wherein each entry in the data structure identifies a global sequence number and at least one pending operation against one or more of a plurality of replicas of the graph-based database.

12. The system of claim 9, wherein to determine that the second operation does not conflict with the first operation the database instance includes further instructions that upon execution cause the database instance to:

identify a set of entries in the data structure having a global sequence number greater than a replica sequence number of the second database replica; and determine, for each entry in the set, a write conflict set of the entry does not include the element.

13. The system of claim 9, wherein to determine that the second operation does not conflict with the first operation the database instance includes further instructions that upon execution cause the database instance to:

receive a replica sequence number of the second database replica and a read conflict set that identifies the element;

identify a set of entries in the data structure having a global sequence number greater than the replica sequence number of the second database replica; and determine, for each entry in the set, a write conflict set of the entry does not include an entry in the read conflict set.

14. The system of claim 9, the database instance including further instructions that upon execution cause the database instance to:

receive an identifier of a third operation to perform on the element, wherein the third operation is to delete the element;

receive an identifier of a fourth operation to perform on the element;

determine that the fourth operation conflicts with the third operation; and cause an error to be sent to an originator of the fourth operation.

15. The system of claim 9, wherein the graph-based database is a multi-hierarchical graph-based database, the conflict-free replicated data type is a primitive type of the multi-hierarchical graph-based database, and the element is an attribute of at least one of a node or an edge of a graph of the graph-based database.

16. The system of claim 9, wherein the data structure is ordered by the global sequence number in each of the entries.

17. The system of claim 16, wherein each entry in the data structure includes a global sequence number and at least one pending operation against one or more of a plurality of replicas of the database instance, and wherein the at least one pending operation of each entry was received by one or more of the plurality of replicas.

18. The system of claim 9, wherein the first operation is to increment the element, and wherein the second operation is to increment the element.

* * * * *